(12) United States Patent
Veeraraghavan et al.

(10) Patent No.: US 9,769,137 B2
(45) Date of Patent: *Sep. 19, 2017

(54) EXTENSIBLE MECHANISM FOR SECURING OBJECTS USING CLAIMS

(71) Applicant: Microsoft Technology Licensing, LLC, Redmond, WA (US)

(72) Inventors: Venkatesh Veeraraghavan, Seattle, WA (US); Javier Dalzell, Issaquah, WA (US); Benoit Schmitlin, Seattle, WA (US); Ambrose T. Treacy, Woodinville, WA (US); Bryant Fong, Kirkland, WA (US); Christian Roy, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/624,137

(22) Filed: Feb. 17, 2015

(65) Prior Publication Data

US 2015/0180853 A1    Jun. 25, 2015

Related U.S. Application Data

(63) Continuation of application No. 12/144,880, filed on Jun. 24, 2008, now Pat. No. 8,990,896.

(51) Int. Cl.
*G06F 21/20* (2006.01)
*H04L 29/06* (2006.01)
*G06F 21/33* (2013.01)

(52) U.S. Cl.
CPC ............ *H04L 63/08* (2013.01); *G06F 21/335* (2013.01)

(58) Field of Classification Search
CPC .............................. H04L 63/08; G06F 21/335
See application file for complete search history.

(56) References Cited

U.S. PATENT DOCUMENTS

| | | | |
|---|---|---|---|
| 6,701,314 B1 | 3/2004 | Conover | |
| 7,093,298 B2 | 8/2006 | Rodriguez et al. | |
| 7,124,192 B2 | 10/2006 | High, Jr. et al. | |
| 7,243,369 B2 | 7/2007 | Bhat et al. | |
| 7,603,555 B2 | 10/2009 | Schmidt et al. | |
| 7,610,390 B2 | 10/2009 | Yared et al. | |
| 7,774,830 B2 | 8/2010 | Dillaway et al. | |

(Continued)

OTHER PUBLICATIONS

[MS-CPSWS]: SharePoint Claim Provider Web Service Protocol Specification, © 2010; 80 pages.

(Continued)

*Primary Examiner* — Brandon Hoffman
*Assistant Examiner* — Nega Woldemariam

(57) ABSTRACT

An extensible mechanism for providing access control for logical objects in a network environment. A security broker is able to dynamically register one or more claims providers, each of which can assert one or more claims about logical objects. The claims providers may be purpose built or may be third party applications which expose data or business rules for use. Claims may be augmented by additional claims providers after the original claim is asserted. The applicability of claims may be scope limited either at the time the claims provider is registered or when the user requests that a security token be issued.

20 Claims, 6 Drawing Sheets

(56) References Cited

U.S. PATENT DOCUMENTS

| | | | |
|---|---|---|---|
| 7,849,204 | B2 | 12/2010 | Yared et al. |
| 7,924,709 | B2 | 4/2011 | Lynn |
| 8,037,194 | B2 | 10/2011 | Yared et al. |
| 8,220,035 | B1 | 7/2012 | Pravetz et al. |
| 8,689,004 | B2 | 4/2014 | Dalzell et al. |
| 8,990,896 | B2 | 3/2015 | Veeraraghavan et al. |
| 2002/0095571 | A1 | 7/2002 | Bradee |
| 2003/0149781 | A1 | 8/2003 | Yared et al. |
| 2004/0153558 | A1 | 8/2004 | Gunduc et al. |
| 2005/0091264 | A1 | 4/2005 | Cameron et al. |
| 2005/0097351 | A1 | 5/2005 | Patrick et al. |
| 2005/0254514 | A1 | 11/2005 | Lynn |
| 2006/0015727 | A1 | 1/2006 | Birk et al. |
| 2006/0053296 | A1 | 3/2006 | Busboom et al. |
| 2006/0095335 | A1 | 5/2006 | Kugel et al. |
| 2006/0123234 | A1 | 6/2006 | Schmidt et al. |
| 2006/0123472 | A1 | 6/2006 | Schmidt et al. |
| 2006/0195420 | A1 | 8/2006 | Kilroy |
| 2006/0206931 | A1 | 9/2006 | Dillaway et al. |
| 2006/0236382 | A1 | 10/2006 | Hinton et al. |
| 2006/0248598 | A1* | 11/2006 | Johnson ............ G06F 21/33 726/27 |
| 2006/0259776 | A1 | 11/2006 | Johnson et al. |
| 2007/0156691 | A1 | 7/2007 | Sturms et al. |
| 2008/0014931 | A1 | 1/2008 | Yared et al. |
| 2008/0016232 | A1 | 1/2008 | Yared et al. |
| 2009/0165105 | A1 | 6/2009 | Chaudhry |
| 2009/0193493 | A1 | 7/2009 | Becker et al. |
| 2009/0271856 | A1* | 10/2009 | Doman ............... G06F 21/33 726/9 |
| 2009/0320103 | A1 | 12/2009 | Veeraraghavan et al. |
| 2012/0117609 | A1 | 5/2012 | Dalzell et al. |

OTHER PUBLICATIONS

[MS-PEOPS]: People Web Service Protocol Specification, © 2010; 31 pages.

Buchta et al.—"Oracle Secure Enterprise Search 11g"—Version 11.1.2, © 2005; 37 pages.

Configure Web SSO authentication by using ADFS (Windows SharePoint Services), [Internet], updated Feb. 2007, 8 pp. http://technet2.microsoft.com/windowsserver/WSS/en/library/306b2d56-4419-432b-bf72-b4cae3845b00103 .mspx?mfr~true, printed Sep. 20, 2007.

Installing MOSS as a claims aware application in ADFS, [Internet], ADFS Product Support Blog, 7 pp. http://blogs.technet.com/adfs/archive/2007I02114/ installing-mo ss-as-a-claims-aware-appliation -in-adfs.aspx, printed Sep. 20, 2007.

Janczuk, T., Windows Communication Foundation Authorization with Claims, [Internet] Microsoft, 2 pp. http://wcf.netfX3.com/files/folders/3626/download.aspx, printed Sep. 20, 2007.

Microsoft®, Windows SharePoint Services Role updated Sep. 21, 2007, [Internet], 7 pp: http://technet2.microsoft.com/windowsserver2008/ en/library/8e79 I b89-86c8-4c72-bb07-71656a25efl6I033 .mspx?mfr~true, printed Sep. 20, 2007.

RFC2258—Internet Nomenclator Project, © 1998; 12 pages.

The Mack Page, © 2007-2009; 12 pages.

U.S. Appl. No. 12/144,880, Amendment and Response filed Dec. 27, 2011, 15 pgs.

U.S. Appl. No. 12/144,880, Amendment and Response filed Jul. 15, 2011, 15 pgs.

U.S. Appl. No. 12/144,880, Amendment and Response filed Sep. 8, 2014, 13 pgs.

U.S. Appl. No. 12/144,880, Notice of Allowance mailed Nov. 10, 2014, 7 pgs.

U.S. Appl. No. 12/144,880, Office Action mailed Apr. 15, 2011, 14 pgs.

U.S. Appl. No. 12/144,880, Office Action mailed Jun. 6, 2014, 19 pgs.

U.S. Appl. No. 12/144,880, Office Action mailed Sep. 28, 2011, 16 pgs.

U.S. Appl. No. 12/969,007, Amendment and Response filed Nov. 28, 2012, 14 pgs.

U.S. Appl. No. 12/969,007, Amendment and Response filed May 24, 2013, 13 pgs.

U.S. Appl. No. 12/969,007, Notice of Allowance mailed Feb. 27, 2013, 22 pgs.

U.S. Appl. No. 12/969,007, Notice of Allowance mailed Jul. 8, 2013, 20 pgs.

U.S. Appl. No. 12/969,007, Office Action mailed Aug. 28, 2012, 39 pgs.

\* cited by examiner

EXTENSIBLE MECHANISM FOR SECURING OBJECTS USING CLAIMS

CROSS-REFERENCE TO RELATED APPLICATIONS

This application is a continuation application of U.S. patent application Ser. No. 12/144,880 (now U.S. Pat. No. 8,990,896), entitled "EXTENSIBLE MECHANISM FOR SECURING OBJECTS USING CLAIMS," filed on Jun. 24, 2008, the entire disclosure of which is hereby incorporated herein by reference.

BACKGROUND

In a computer network where a variety of data, services and other logical objects are made available to a user population, security controls must be provided to regulate access. These controls balance protection for these objects against flexibility and ease of use by the administrators and end users. Users may also wish to limit the amount of identifying information which they must provide in order to gain access so that the quantity of their personal information transmitted over the network is minimized.

For an administrator, it is desirable that the security policies to be enforced be selectable by either type of object or for each object individually. Where necessary, different levels of security should be available, and easily configurable, to match a wide range of needs. Redundant information and duplicate effort should be minimized.

For an end user, it should be easy to gain access to a secured object and the experience of gaining access should be uniform across all objects. Where multiple methods are available, the user should be presented with a choice of which to use.

For all users, the methods used to control access should reflect the real world. Where the user is a member of a work group with similar needs, that group should be available to identify those users and their access rights. Where similar groups are applicable across a variety of objects, all of those objects should be able to reference the same logical group and see membership changes at substantially the same time. Further, access control should not be limited to a single concept such as groups. Existing, and new, concepts and rules used by one service or application should be available for use with other protected objects.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

Various aspects of the subject matter disclosed herein are related to securing objects in a computer network environment building upon the concepts of brokered authentication and claims based security. The disclosure addresses providing an extensible set of claims through the capability of dynamically registering claims providers rather than using a fixed set of claims.

Other aspects relate to specifying a scope to which the claims asserted by a claims provider will be applicable at the time the claims provider is registered and then enforcing that scope when an access request is received.

Still other aspects relate to providing augmented claims by polling the registered claims providers once an initial claim, or set of claims, is obtained in order to acquire additional claims which may be identified.

Additional aspects relate to filtering the set of claims which will be provided based upon one or more characteristics of the user, the user's session, the user's connection, or other characteristics of the request. This filtering may be user configurable or may be autonomously enforced by a registered claims provider.

The approach described below may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the above summary can be obtained by reference to the accompanying drawings, which are briefly summarized below, to the following detailed description of present embodiments, and to the appended claims.

DETAILED DESCRIPTION

This detailed description is made with reference to the accompanying drawings, which form a part hereof, and which show, by way of illustration, specific exemplary embodiments. These embodiments are described in sufficient detail to enable those skilled in the art to practice what is taught below, and it is to be understood that other embodiments may be utilized and that logical, mechanical, electrical, and other changes may be made without departing from the spirit or scope of the subject matter. The following detailed description is, therefore, not to be taken in a limiting sense, and its scope is defined only by the appended claims.

Throughout this document, much of the discussion is presented in terms of authentication and authorization. These are two well understood aspects of the larger issue of controlling access to logical objects on a network to which the present disclosure is applicable. These aspects are used for illustrative purposes and are not intended to limit the scope. Herein, securing an object and controlling access to an object are considered to be synonymous.

Architecture and Interactions

The concepts of the present disclosure are applicable to both federated and non-federated network environments. For the purposes of this disclosure, a federation is a collection of trust domains that have established mutual pair-wise trust. Conversely, a non-federated environment is where all relevant entities are contained within a single trust domain.

Figure 1:
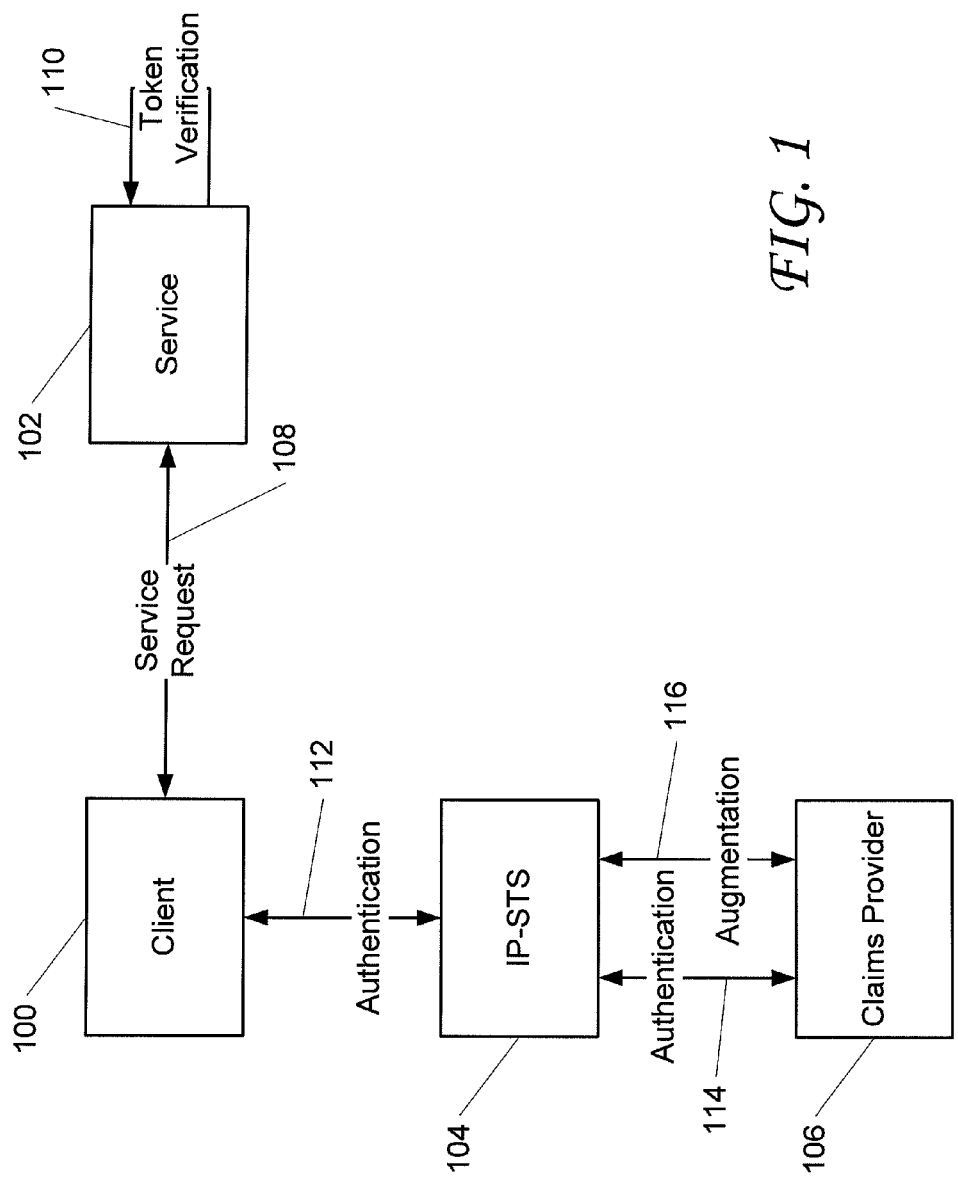
FIG. 1 is a block diagram illustrating an exemplary software architecture for use in a non-federated environment.
Figure 5:
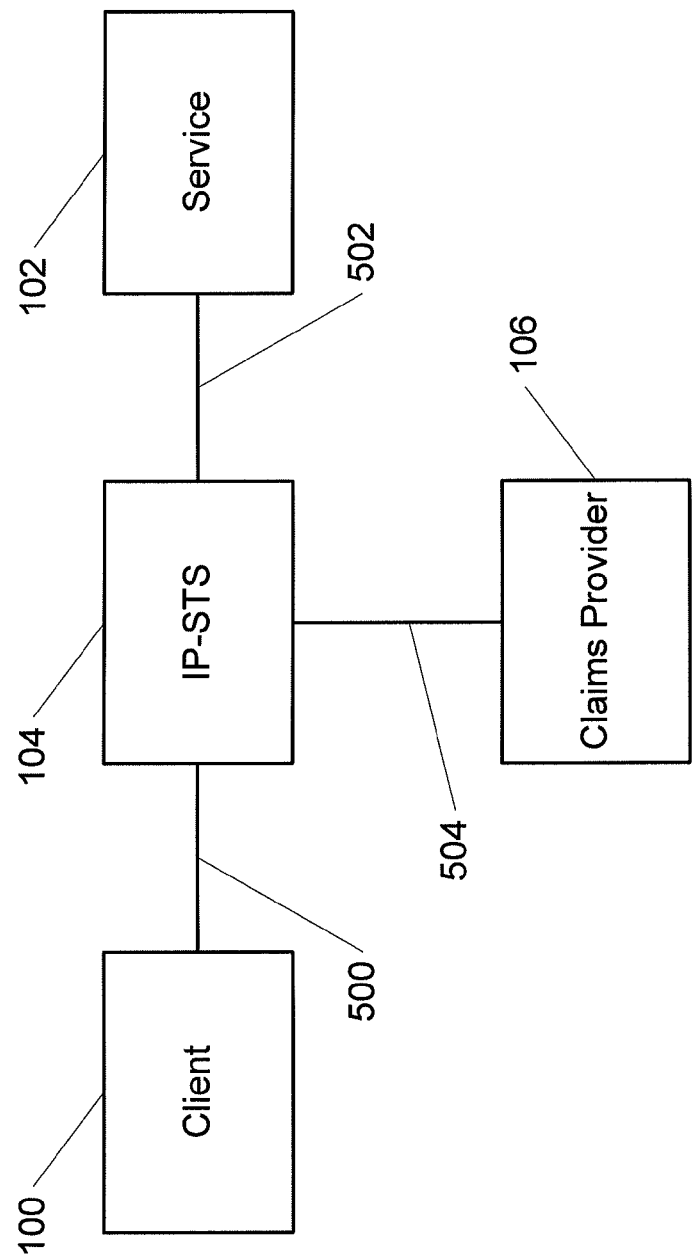
FIG. 5 is a block diagram illustrating significant trust relationships involved in handling an access request in a non-federated environment.

FIG. 1 presents an exemplary architecture for implementing the concepts of the present disclosure in a non-federated environment. This architecture builds upon the brokered authentication security model. In this exemplary architecture, the client 100 and the service 102 do not have a direct trust relationship and so do not handle authentication or other access requests directly. Instead, a broker, such as the identity provider security token service (IP-STS) 104 maintains a trust relationship with each of the client and the service and provides access control. See FIG. 5 and associated discussion below for more details. While "service" is used herein to describe the entity which receives the request from the client, that term is intended to encompass the broad concept of a "relying party" which needs to authenticate or authorize the client before supplying some form of data or service.

The exemplary architecture of FIG. 1 also builds upon the claims based security model and the use of security tokens to communicate claims. A claim is an assertion made about a logical object such as the name or identity of the object; an encryption key held by the object; a group of which the object is a member; or a privilege, capability, or other characteristic of the object. An object is any system entity that can be granted security rights or that makes assertions about security or identity. An object might be a client, a service, or other resource but might also be any of various other entities having the requisite capabilities.

In an exemplary implementation, access control for client 100 and service 102 begins when claims are asserted by an IP-STS 104 and packaged in a security token. That token is provided to the client 100 in response to authentication request 112 and passed on to any service 102 to which it sends a service request 108. Note that the initial request could be triggered by an attempt to use a service which requires authentication. The service 102 then verifies the token 110 and uses the contained claims to determine whether to grant the requested access. The security token could be verified with the issuing IP-STS but typically this interaction is not needed because the token itself can contain proof of a relationship with the broker, such as public key encryption, which can be used by the service to perform the token verification 110. The claims providers 106 plug in to the IP-STS 104 providing extensibility and flexibility in the types of claims which can be supported by the system. Note that in this scenario the service 102 may be the object being protected or it may be an application which provides access to a protected object such as file system providing access to a file.

Figure 3:
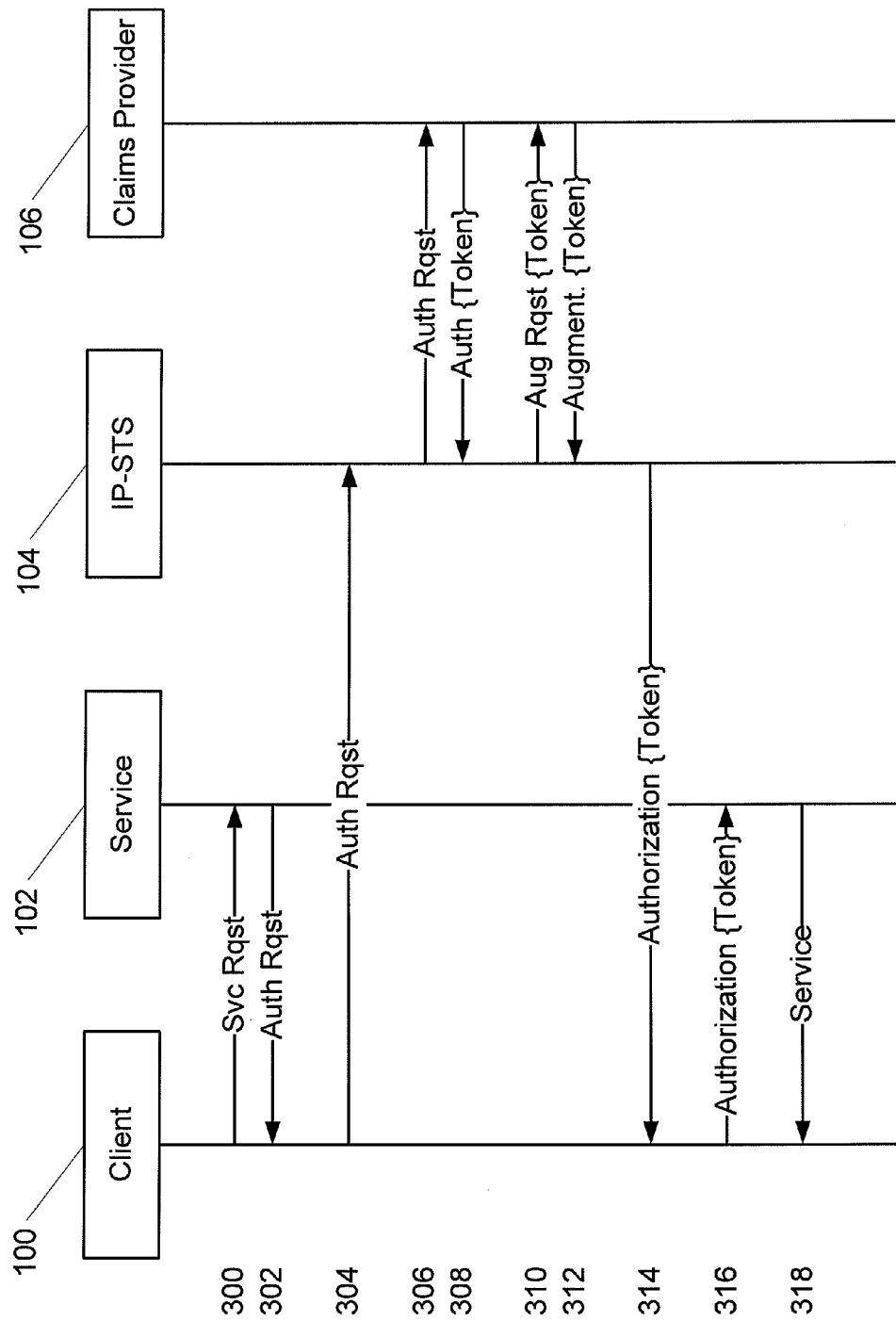
FIG. 3 is a sequence diagram illustrating the time ordered sequence of interactions involved in handling an access request in a non-federated environment.

The sequence diagram of FIG. 3 illustrates an exemplary time ordered sequence of interactions involved in a non-federated authentication. The original service request 300 is sent from the client 100 to the service 102. Where the client 100 has not already been authenticated, the service 102 responds with an authentication request 302. Optionally, this original request, or subsequent interaction with the service, may identify which claim or claims could be used for authentication. The client 100 sends authentication request 304 to the IP-STS 104 asking that a security token be generated containing appropriate claims.

At this point, the IP-STS 104 must authenticate the client 100 for its own purposes, assuming that this has not already occurred. This authentication will have to satisfy the greater of two sets of requirements: the claims needed to satisfy the service, and the claims needed to satisfy the minimum threshold of the IP-STS itself. Based on these requirements, one or more claims providers 106 may be identified which are capable of authenticating the client 100. These options will preferably be presented to the user who is interacting with the client 100. The user will select one option for use and an authentication request 306 will be sent to the selected claims provider 106. Alternatively, a single claim may be selected by the system and presented to the user with no option for the user to make a selection. When the selection is presented, the user will interact with the claims provider 106 to supply the required criteria (i.e. password, biometric scan, magnetic card swipe, etc.). Once the user has supplied the proper information, the claims provider 106 will generate and populate a security token containing the claims which the selected claims provider 106 can assert about the user. This token is returned to the IP-STS 104 as a part of the response 308. Alternatively, the token could have been generated as an empty token by the IP-STS 104 and supplied to the claims provider 106.

An alternative embodiment may limit the set of claims providers 106 which is made available by characteristics of either the user or the client or both. For example, in a commercial environment, the option to use a proximity key for authentication may not be presented to an hourly employee because such keys are only issued to salaried personnel. Similarly, an option to swipe a credit card or employee badge may not be presented where the client (or the link to the client) lacks the security to protect the information.

At this point, the client has been authenticated to the IP-STS 104. The original token may contain sufficient claims to satisfy the needs of the service 102, or it may not. A process known as claims augmentation can be used to provide any missing claims or to provide supplemental claims which will support authentication and/or authorization of the client. As part of the augmentation process an augmentation request 310 containing the original security token is sent to each claims provider 106 which is registered with the IP-STS 104. Each claims provider will add to the security token those claims which it can assert about the user. After all claims providers have responded, the security token will contain a superset of claims which can be asserted about the client.

Alternatively, the claims providers 106 which are contacted during claims augmentation, or the claims returned by the claims providers, may be limited by the authentication level of the client. For example a client which authenticated using the highest available level of authentication (i.e., ID card scan plus biometric scan) would be able to obtain all available claims during augmentation. But a client which authenticated using the lowest available level of authentication (i.e., email address plus password) would not be able to obtain augmented claims considered to be of a higher level (i.e., a PKI public key might be withheld).

The fully augmented security token is returned to the client 100 as a part of the authorization response 314 to authorization request 304. This token is then provided to the service 102 as part of the authorization response 316 to authorization request 302. The service 102 will validate the token and examine the contained claims to confirm that its authentication needs are satisfied. It may optionally also perform authorization for the user based on the available claims. With the client 100 properly authenticated, the service 102 will now provide the service 318 which was originally requested.

Where the concepts of the present disclosure are applied in a federated environment, additional entities and additional trust relationships are needed. The level of trust may vary, but it typically includes authentication and might include authorization. Multiple domains can be supported, but the architecture and interactions for a single pair of domains are directly extensible and so will be used for clarity.

Figure 2:
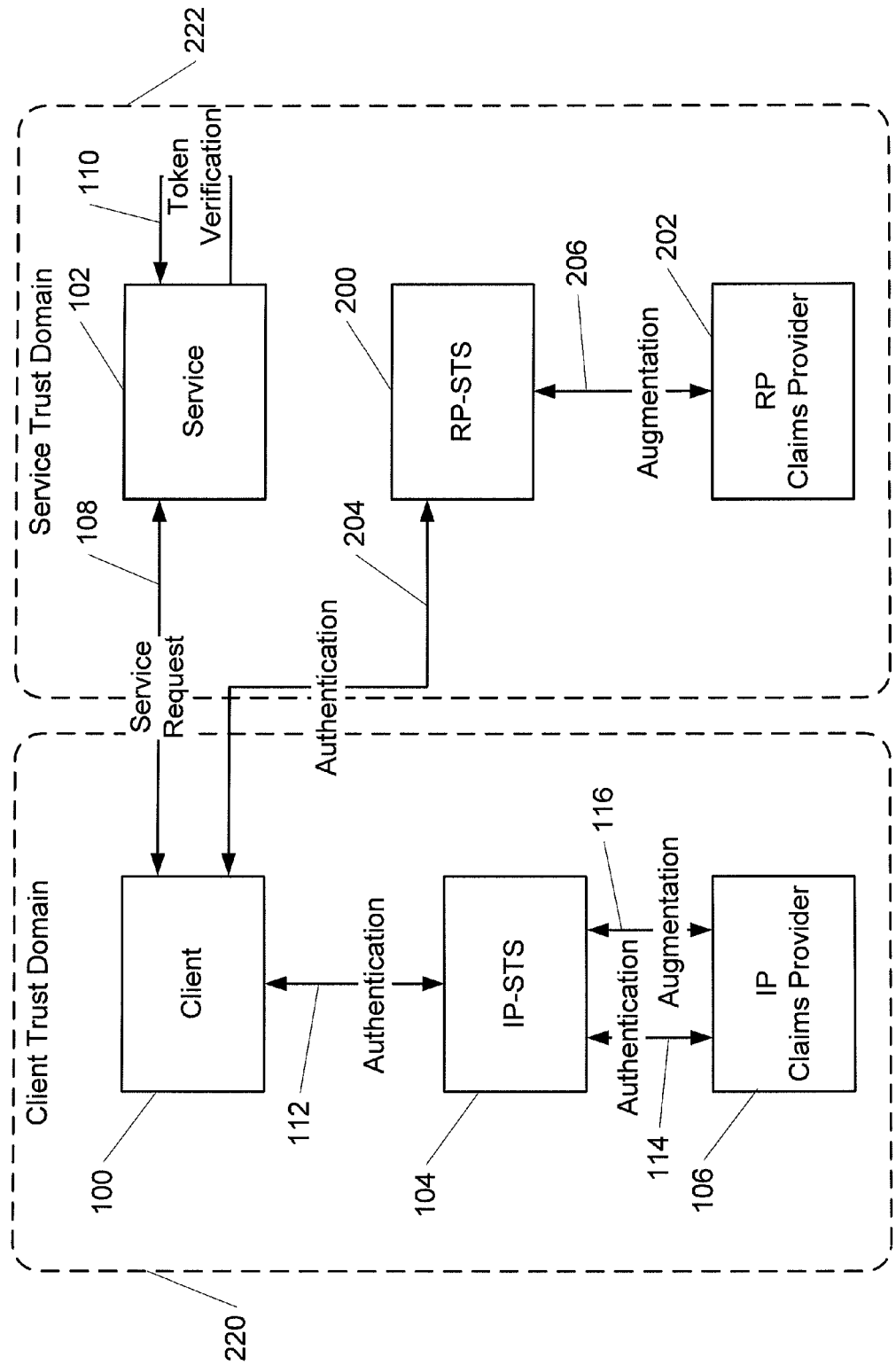
FIG. 2 is a block diagram illustrating an exemplary software architecture for use in a federated environment.

Referring to FIG. 2 it can be seen that there are two trust domains overlaid on the exemplary architecture: the client trust domain 220 and the service trust domain 222. The client 100, IP-STS 104, and claims provider 106 which are in the client trust domain 220 are the same entities as discussed above for the non-federated environment of FIG. 1 but their interactions are slightly altered in some cases. Service 102 is the same entity as for the non-federated environment, but it now exists in a different trust domain. Because of this, it no longer has a trust relationship with the IP-STS 104 and so can not rely on it for access control. The only trust relationships which cross trust domain boundaries are those between brokers, more specifically STS's. A relying party STS (RP-STS) 200 exists in the server trust domain to serve those entities within that domain. In a preferred embodiment, it has an associated set of relying party claims providers 202. The RP-STS 200 and relying party claims providers 202 may be implemented as being identical to the IP-STS 104 and identity provider claims providers 106. This allows for symmetrical operations where a client in the server trust domain needs to access a service in the client trust domain.

Figure 4:
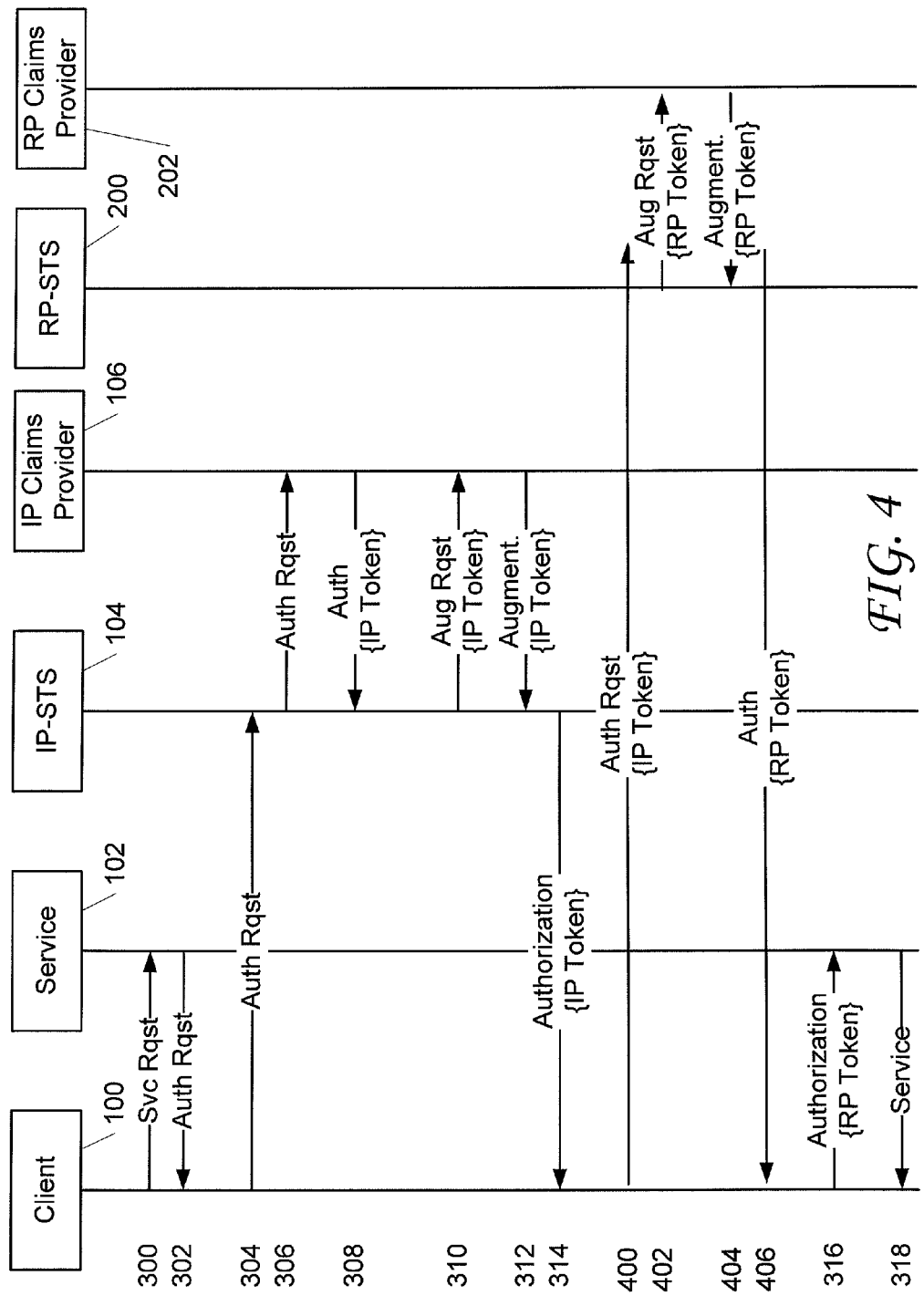
FIG. 4 is a sequence diagram illustrating the time ordered sequence of interactions involved in handling an access request in a federated environment.

Referring to the sequence diagram of FIG. 4 the interactions of the entities in a federated environment can be seen. Where interactions are numbered identically with FIG. 3 they can be understood to be the same interactions as described for the non-federated environment unless a difference is identified herein. Interactions 300 through 314 proceed in substantially the same manner as for the non-federated environment. One difference is that the authorization requests preferably identify that the request is for a different trust domain and preferably identifies the domain for which authorization is being requested. This allows the IP-STS 104 to make any required changes or additions to the structure or content of the security token so that it can be consumed by the RP-STS 200 rather than a service.

When the client 100 receives the security token after authenticating with the IP-STS 104 it must perform an additional task before it can present a token to the service 102. Because the security token was generated in a different trust domain, it will not be accepted by the service 102. The token must be presented to the RP-STS 200 in order to obtain a token which can be used in the service trust domain 222. This is represented by authentication relationship 204 in FIG. 2 and by interactions 404-410 below. In an exemplary embodiment, the RP-STS 200 to which the token must be presented will be identified by the service 102 in authentication request 302. The client 100 sends an authentication request 400 to the RP-STS 200 and supplies the security token generated by the IP-STS 104. The RP-STS confirms that it has a trust relationship with the issuing IP-STS 104, verifies the security token, and confirms that it contains at least one claim which is sufficient to authenticate the client 100 to entities in the server trust domain. If such a claim is found, the RP-STS 200 issues a security token for the server trust domain containing at least one claim which is valid in the server trust domain and copies some or all of the claims found in the security token issued by the IP-STS 104. It then performs its own claims augmentation process 206 (see FIG. 2) in the same manner as described above for the IP-STS 104. Each of the relying party claims providers 202 are contacted 402 and each adds to the security token 404 such claims as it can assert for the client 100 based on the claims provided by the RP-STS 200. The fully augmented security token is returned to the client 100 in the response 406. This token is then presented 316 to the service which verifies the token and provides service 318 as described above.

In an exemplary embodiment, the two trust domains may utilize different formats, content, encoding, or other differences for their security tokens. In this case the process of issuing the token for the service trust domain 222 may comprise mapping claims from the token issued by the IP-STS 104 into the local format in place of or in addition to copying the claims.

Trust Relationships

The exemplary claims based brokered authentication approach discussed herein incorporates trust relationships between the various entities. As discussed above, there is not typically a direct trust relationship between the client and the service. Instead the relationships illustrated in FIG. 5 predominate for a non-federated environment. The trust relationship 500 between client 100 and IP-STS 104 supports the issuance of a security token to the client which contains claims made about the client by the IP-STS 104. Similarly, trust relationship 502 between service 102 and IP-STS 104 supports the acceptance and verification of claims made by the IP-STS 104 about the client 100.

The trust relationship 504 between the IP-STS 104 and the claims provider(s) 106 allows for an extensible set of claims to be asserted by the IP-STS 104 based on the claims made by each of the claims providers. In an exemplary embodiment, this trust relationship 504 is dynamically established when a claims provider 106 registers with the IP-STS 104. Registration makes the claims provider 106 known to the IP-STS 104 and allows those claims supported by the claims provider 106 to be used by the IP-STS 104. As part of the registration process, the user performing the registration can optionally specify the scope to which the claims provider applies. This scope specification can take at least two forms. The first involves the user selecting one or more of the services, websites, directories, or other logical objects, or types of object, which are supported by the IP-STS 104 as being able to use the claims provider 106 or a specific claim assertable by it. The second form consists of specifying a set of rules which identify the scenarios in which the claims provider 106 can be used. For example, where an application, such as a resource management system is acting as a claims provider, its use may be limited to situations in which the user being authenticated is logged in to a system on the internal network. Conversely, authentication via a biometric scan may only be made available to external users where there is a need for stronger authentication A similar contextual limitation may be applied by the claims provider itself at the time when the user is being authenticated. User context information (such as host ID, subscription data, user ID, etc.) can be provided to each of the claims providers 106. Each may then apply its own internal rules to determine which of its supported claims it will make available. This allows the claims provider 106 to trim the set of claims that it will expose to fit the circumstances.

Figure 6:
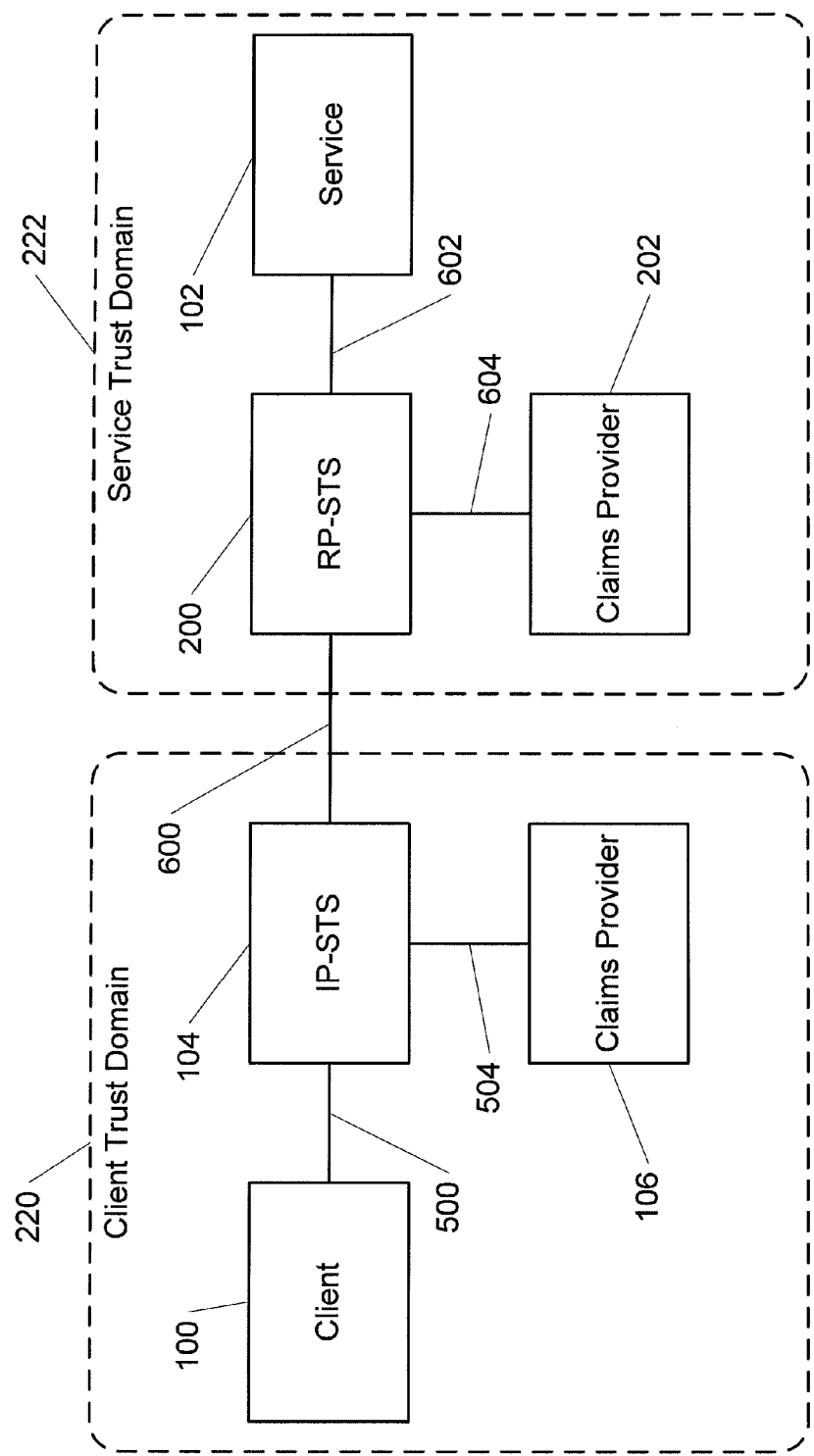
FIG. 6 is a block diagram illustrating significant trust relationships involved in handling an access request in a federated environment.

FIG. 6 illustrates the significant trust relationships in a federated environment. Relationships 500 and 504 are the same as for the non-federated environment. As discussed above, the service 102 and the IP-STS 104 can not have a direct trust relationship because they are in different trust domains 220 and 222. Instead, service 102 has a trust relationship with the RP-STS 200 which is located within its trust domain 222. This relationship serves the same purpose as trust relationship 502 in the non-federated environment, providing for the acceptance and verification of claims asserted by the RP-STS 200. Trust relationship 604 between the RP-STS 200 and the RP claims provider(s) 202 is similar to relationship 504 and enables the RP-STS 200 having an extensible set of claims which it can assert.

Trust relationship 600 is unique to the federated environment. Where the IP-STS 104 in the client trust domain 220 has a trust relationship 600 with the RP-STS 200 in the service trust domain 222 a claim asserted by the IP-STS 104 can be accepted by the RP-STS 200 and optionally translated into a local claim asserted by the RP-STS 200. This approach allows the client 100 and service 102 to continue relying solely upon their local STS in the federated environment as in the non-federated environment. The trust relationships which bridge trust domain boundaries are solely between STSs. These relationships are established by security personnel for each RP-STS 200. In an exemplary embodiment, for each IP-STS in a different trust domain, the STSs will authenticate each other and establish a secure communications link. They will then exchange information about the claims which each STS is able to assert, including those available from their respective claims providers 106 and 202. The security personnel will then select which of the available claims from the other STS will be accepted and what, if any, mapping will be performed to local claims. They may also be mapped to other representations of security information such as roles or groups used for authentication and authorization by more conventional models.

In an exemplary embodiment, the RP-STS 200 will be configured to generate a security token which segregates claims into two distinct categories when relying on claims from a trusted IP-STS 104. A first set will contain those local claims generated by the RP-STS 200 and may be further subdivided into claims which identify the entity in question and those which specify an attribute or characteristic of the entity. A second set of claims will be those received from the IP-STS 104, typically not subdivided. This provides ease of access to those claims most likely to be used by the local service 102 while still allowing the original claims asserted by the IP-STS 104 to be used where applicable.

Claims Providers

Claims providers are primarily a mechanism for providing access control extensibility. Rather than providing a fixed set of claims which can be used for authentication and/or authorization, an STS can provide, and validate, claims provided by any registered claims provider. Any one STS may have a variety of claims providers available and that set of claims providers can be dynamic. While claims providers can be purpose built applications whose main focus is to assert and validate claims, they may also be existing applications which already implement a "claim" and can now expose this information to the STS for use in the security model.

One example of such an application is an e-mail system. Most e-mail systems support the concept of a distribution list (DL). A user can define a list of e-mail users who can be selected as a group to receive certain messages. It is likely that this DL comprises a set of users who have a common need to access a certain type of data (i.e. sales personnel who need to see sales figures). While e-mail is one forum for distribution of this data, it is not the only one. It is likely that there will be files in a files system and pages on a web server which are also of interest to this group and it may be desirable to restrict access to only this group. In most security models, it is necessary to establish a role or group which corresponds to the DL in order to implement this goal. However, the DL and the role/group are not logically linked and need to be maintained separately. The concepts of the present disclosure allow the mail system to be modified to serve as a claims provider. It can then expose the distribution lists as claims so that they can be used directly to authenticate or authorize users.

Another example is a resource management application which maintains organization charts. It is common to need to restrict access to certain types of information by where a user appears on an organization chart. Financial performance data may be restricted to senior management. Critical technical data may only be available to the research and development (R&D) staff. Sales projections are only accessible by the sales staff. As above, most security models will require that a role or group be established and maintained in parallel to the organization chart. Exemplary implementations of the present disclosure allow the resource management application to function as a claims provider exposing the organization chart as a set of claims. Additional business logic which is normally internal to the resource management application can be used to support more complex claims. For example, senior R&D managers can be selected to receive sensitive risk data for ongoing projects while sales personnel meeting specified sales goals can be granted access to "members only" web pages. Each of these sets of claims can be dynamic, updating to follow the organization charts and sales figures as they change. This type of flexibility is difficult to achieve without claims providers.

There are three significant times where a claims provider 106 becomes involved in the security model. The first is when an administrator, or other personnel, specifies the security policies to be used for a service (102 in the figures) or other entity. This would include selecting the claims which are deemed sufficient to allow a user to access the service 102. This process would typically include the administrator being presented a list of the available claims providers and the claim or claims which each of them can assert. The administrator then selects some or all of the available claims which will be considered sufficient to satisfy the security needs for the service being configured. This process is also applicable to files, websites, and other entities for which security is provided.

The second time the claims provider 106 becomes involved is when the client 100 attempts to access the service 102. As discussed above with respect to the sequence diagrams, the initial request will trigger a response from the service which indicates that the user must authenticate and which may specify one or more claims, or sets of claims, which will suffice for authentication. Where the service is configured to accept more than one claim, or sets of claims, and the STS has more than one matching claim available for use, the user has more than one option for authenticating to the same service. The client will then provide an interface to the user, either directly or by activating a dedicated application such as an access manager, which allows the user to select a claim which is available to them and which also satisfies the requirements specified by the service. In an exemplary embodiment, each method of authentication may provide the user with a different set of privileges, or authorizations, with the service and may require a different set of information from the user in order to authenticate. This provides the user with the capability to select the claim which exposes the minimal amount of information while still obtaining the level of service required.

The third involvement of the claims provider 106 is the validation of the claim after the security token has been generated and delivered to the service 102 as described above. This step may be optional depending on the implementation of the token and on the relationship between the service and its local STS. In an exemplary embodiment, the token may be digitally signed, such as by using a PKI key, in such a way that the service can verify the token without interacting with the STS or the claims provider. Another exemplary embodiment may provide verification of the token via the STS which may then rely on the claims provider to verify its claim at that time. This approach may be advantageous in situation where claims are dependent upon highly dynamic data or business logic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A computer system comprising:
   at least one processing unit; and
   at least one memory storing computer-readable instructions that when executed by the at least one processing unit cause the computer system to perform a method of securing access by a first object to a second object on a computer network, the method comprising:
      dynamically registering a first claims provider to a dynamic set of registered claims providers, wherein the first claims provider is capable of authenticating the first object to the second object, wherein the first claims provider is an application associated with the first object that has information regarding the first object's membership in a group, wherein the first claims provider is one of: an email application that maintains at least one distribution list including at least the first object and a resource management application that maintains at least one organizational chart including at least the first object;
      receiving from the first claims provider a first security claim identifying the first object as a member of the group; and
      providing the first security claim to the second object, wherein the first object is allowed access to the second object upon receipt of the first security claim by the second object.

2. The computer system of claim 1, further comprising: associating an applicable scope with the first security claim.

3. The computer system of claim 2, wherein the applicable scope specifies one or more objects to which the first security claim applies.

4. The computer system of claim 2, further comprising: issuing a claims request when the first object is within the applicable scope.

5. The computer system of claim 2, wherein the applicable scope specifies a rule for determining whether the first security claim applies.

6. The computer system of claim 1, wherein the computer system is a security broker for dynamically registering claims providers.

7. The computer system of claim 1, further comprising:
   issuing an augmentation request to the dynamic set of registered claims providers, wherein the augmentation request comprises an existing security claim; and
   receiving at least one additional security claim from the dynamic set of registered claims providers.

8. The computer system of claim 1, further comprising:
   providing a plurality of security claims that can be asserted by one or more registered claims providers;
   receiving a selection of at least one security claim of the plurality of security claims; and
   sending a claims request to at least one registered claims provider that can assert the selected security claim.

9. The computer system of claim 1, further comprising:
   receiving a characteristic of the first object; and
   issuing a claims request to the dynamic set of registered claims providers when the characteristic matches a predefined value associated with at least one registered claims provider.

10. A method implemented on a computing system for securing access to a second object by a first object, the method comprising:
    receiving a request from the first object to access the second object, wherein access to the second object is limited by membership in a group;
    dynamically registering a first claims provider to a dynamic set of registered claims providers, wherein the first claims provider is capable of authenticating the first object to the second object, wherein the first claims provider is an application associated with the first object that has information regarding the first object's membership in a group, wherein the first claims provider is one of: an email application that maintains at least one distribution list including at least the first object and a resource management application that maintains at least one organizational chart including at least the first object;
    receiving from the first claims provider a first security claim identifying the first object as a member of the group; and
    providing the first security claim to the second object, wherein the first object is allowed access to the second object upon receipt of the first security claim by the second object.

11. The method of claim 10, further comprising:
    associating an applicable scope with the first security claim.

12. The method of claim 11, wherein the applicable scope specifies one or more objects to which the first security claim applies.

13. The method of claim 11, further comprising:
    issuing a claims request when the first object is within the applicable scope.

14. The method of claim 11, wherein the applicable scope specifies a rule for determining whether the first security claim applies.

15. The method of claim 10, wherein the computing system is a security broker for dynamically registering claims providers.

16. The method of claim 10, further comprising:
issuing an augmentation request to the dynamic set of registered claims providers, wherein the augmentation request comprises an existing security claim; and
receiving at least one additional security claim from the dynamic set of registered claims providers.

17. The method of claim 10, further comprising:
providing a plurality of security claims that can be asserted by one or more registered claims providers;
receiving a selection of at least one security claim of the plurality of security claims; and
sending a claims request to at least one registered claims provider that can assert the selected security claim.

18. A computer system, comprising:
a processor; and
a memory storing computer-executable instructions that when executed by the processor cause the computer system to perform a method of securing access to a second object by a first object, the method comprising:
receiving a request from the first object to access the second object, wherein access to the second object is limited by membership in a group;
dynamically registering a first claims provider to a dynamic set of registered claims providers, wherein the first claims provider is capable of authenticating the first object to the second object, wherein the first claims provider is an application associated with the first object that has information regarding the first object's membership in a group, wherein the first claims provider is one of: an email application that maintains at least one distribution list including at least the first object and a resource management application that maintains at least one organizational chart including at least the first object;
receiving from the first claims provider a first security claim identifying the first object as a member of the group; and
providing the first security claim to the second object, wherein the first object is allowed access to the second object upon receipt of the first security claim by the second object.

19. The computer system of claim 18, further comprising:
associating an applicable scope with the first security claim.

20. The computer system of claim 19, wherein the applicable scope specifies one or more objects to which the first security claim applies.

* * * * *